UNITED STATES PATENT OFFICE.

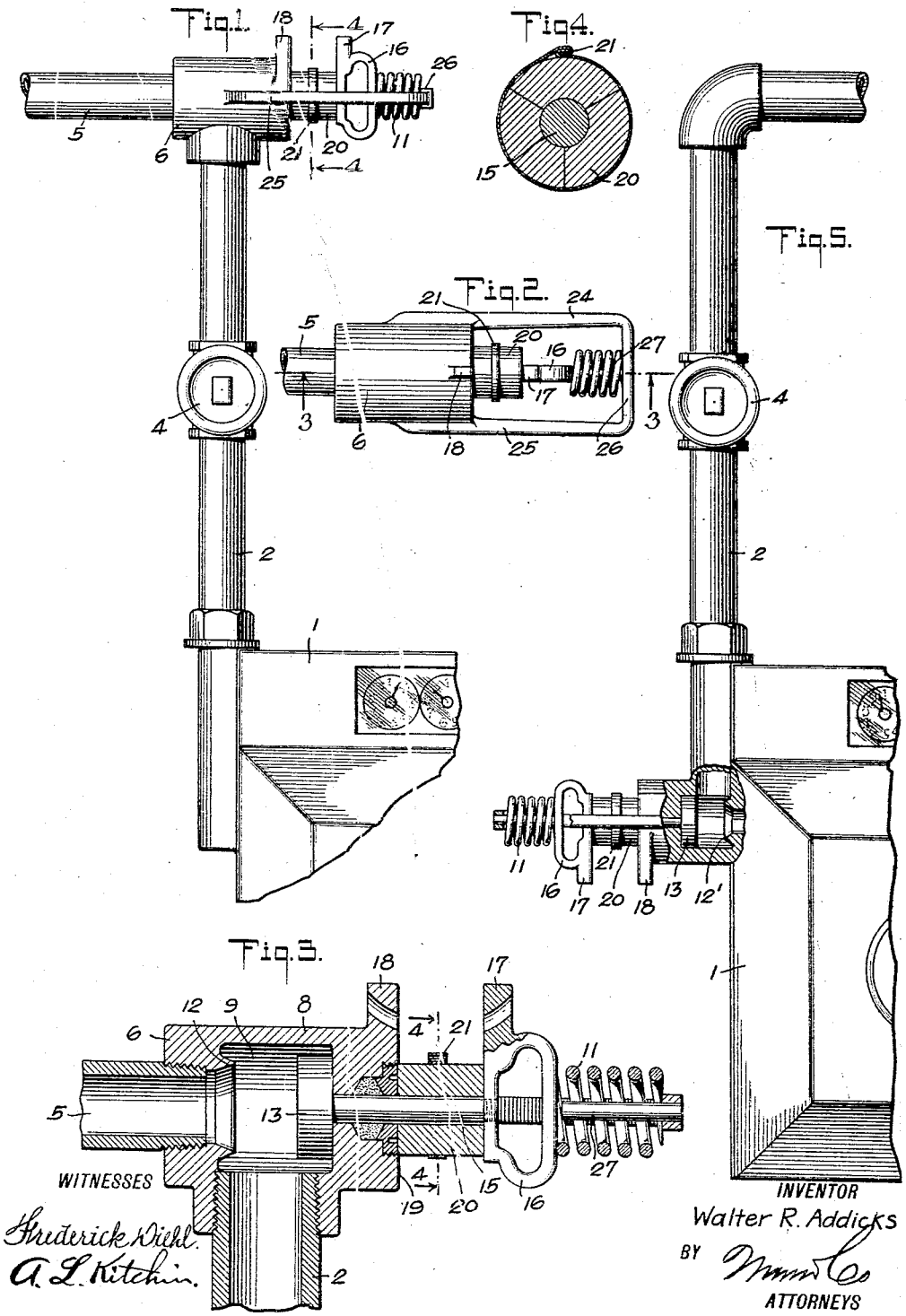
W. R. ADDICKS.
SHUT-OFF VALVE FOR GAS AND OTHER PIPES.
APPLICATION FILED AUG. 11, 1915.
1,286,485. Patented Dec. 3, 1918.
INVENTOR
Walter R. Addicks
BY 
ATTORNEYS

WALTER R. ADDICKS, OF NEW CASTLE, NEW YORK.

SHUT-OFF VALVE FOR GAS AND OTHER PIPES.

1,286,485.  Specification of Letters Patent.  Patented Dec. 3, 1918.

Application filed August 11, 1915. Serial No. 44,882.

*To all whom it may concern:*

Be it known that I, WALTER R. ADDICKS, a citizen of the United States, and a resident of the town of New Castle, in the county of Westchester and State of New York, have invented a new and Improved Shut-Off Valve for Gas and other Pipes, of which the following is a full, clear, and exact description.

This invention relates to shut-off valves for gas and other pipes and has for an object the provision of a shut-off valve which may operate automatically or may manually be caused to operate.

Another object in view is to provide an automatic shut-off valve with a manually removable fuse member whereby the valve may be manually caused to close, and means for receiving a lock so that the valve may be locked against unauthorized opening.

A still further object in view is to provide a shut-off valve which will automatically operate and which may be arranged in various positions as occasion may demand.

In the accompanying drawing:

Figure 1 is a side view of a shut-off valve embodying the invention, same being shown applied.

Fig. 2 is a top plan view of the valve shown in Fig. 1.

Fig. 3 is an enlarged longitudinal vertical section through the valve shown in Fig. 2, the same being taken on line 3—3 of said figure.

Fig. 4 is a detail fragmentary transverse sectional view through Fig. 3 on line 4—4.

Fig. 5 is a fragmentary view of a gas meter and connecting pipes together with a lightly modified form of the invention showing the valve arranged directly on the meter.

Referring to the accompanying drawings by numerals, 1 indicates a meter of any suitable construction, the same forming no part of the present invention. Connected with the meter 1 is the usual inlet pipe 2. The pipe 2 carries a valve 4 which may be used in shutting off the gas and which may be locked by placing a cup or casing (not shown) thereover. Valve 4 may be closed at any time when it is desired to remove or inspect the interior of the meter 1. The street pipe 5 leads from any suitable main and is connected with valve 6, which in turn is connected with pipe 2 so that under normal conditions gas will freely pass from pipe 5 to pipe 2 and from thence through the meter to a house. Valve 6 may operate to shut off a single meter and may operate to close off a multiple number of meters with similar inlet pipes 2.

Valve 6 may be automatically closed in case of fire or may manually be caused to close whenever desired, and after such closing may be locked in a closed position by a suitable lock (not shown). Fig. 3 discloses more clearly the detail structure of valve 6, which is provided with a casing 8, cast or formed in any suitable manner and provided with a chamber 9. Extending into chamber 9 is a valve seat 12, preferably formed with a ridge so that the same may bite into the valve member 13 when the valve member is closed, thus producing a substantially gas-tight closure.

Referring again to Fig. 3, it will be observed that the valve member 13 is provided with a rod 15 which extends through the packing box 22 to a point exterior of the casing. The valve member 13 is preferably made from brass or other suitable comparatively soft metal in order to allow the seat 12 to press into the same. The rod 15 carries an operating handle 16, the outer end of which is formed with an apertured extension 17 so that the bolt of a suitable lock may be passed therethrough and through the apertured extension 18 in the casing 8 after the valve has been operated. It will be observed that between the end 19 of the casing 8 and the grip or handle 16 there is provided a fusible metal 20 which may be of any suitable kind, as for instance lead or solder.

The fusible member 20 may be arranged in a plurality of pieces or sections, as shown in Fig. 4. When the sections are used as shown in Fig. 4 a retaining member 21 is provided which may be formed of a light strip of brass or other suitable material, preferably a strip of metal so that the fusible metal 20 will be retained in place a long number of years if necessary.

In operation, when the heat becomes sufficient to melt the fusible metal 20 the same will melt and drop down out of the way, whereby the spring 11 which is continually maintained under tension is allowed to expand and force the valve member 13 against seat 12. The rod 15 is made of sufficient length for allowing the valve member 13 to press against the seat 12 properly and also allow for the support of the strip 21 in case the same is used. In case it is desired to cause the closure of the valve by manually operated means the fusible metal 20 is removed and the spring 11 allowed to close the valve, after which a lock may be placed in position as heretofore described. This obviates the necessity of a special locking arrangement for the regular valve 4. When the valve 6 has been closed, the same may be easily reset by grasping the handle 16 and pulling on the same until the parts assume the position shown in Fig. 3, after which the fusible metal may be placed in position.

Associated with the spring 11 are a pair of arms 24 and 25 which are connected by a cross bar 26 formed integral with the arms or rigidly secured thereto. The cross bar 26 carries a guiding pin 27 for spring 11 so that the spring will continually bear against the handle 16 so as to close the valve member 13 whenever the fusible member 20 is removed.

In Fig. 5 is seen a slightly modified arrangement of the invention wherein the valve 6 is applied directly to the gas meter rather than to the supply pipe 5. It is evident that other forms of the invention could be applied equally well without departing from the spirit of the invention. As shown in Fig. 5 the valve seat 12' is arranged opposite the valve member 13, which valve member is moved against seat 12' whenever the fusible metal 20 is removed, either by fire or manually.

It will be noted that in all forms of the invention a valve is provided which may be automatically closed and manually caused to close. The valve can act as an automatic shut-off in case of fire but acts as a locking valve when a house becomes vacant, so that the use of a lock is all that is necessary to prevent the unauthorized use of the gas. This eliminates the need for the use of the casing for valve 4 and also eliminates the need for the use of valve 4 at all unless the same may be desirable under some circumstances for temporarily shutting off the gas by the occupant of the house. The device is readily adapted to meters arranged in different places or of any desired style, as well as readily adapted for use either with or without the valve 4. In adapting the device to meters at various places, it is evident that the device may be connected directly with the meter or at a short distance therefrom, as shown in the drawings, without departing from the spirit of the invention.

What I claim is:

1. In an automatic shut-off valve of the character described, a casing provided with an inlet passageway and an outlet passageway, a valve seat, a valve member normally spaced from said valve seat, a rod connected with said valve member and extending exteriorly of the casing, a handle on said rod which acts as a manually operable member and an abutment, a fusible member arranged between said handle and said casing for normally preventing said rod and said valve member from moving, whereby the valve member is held away from said seat, a spring pressing against said handle for giving the handle and rod a tendency to move said valve member against said seat, a guiding pin for guiding said spring, and an anchoring device rigidly connected with said casing, said anchoring device carrying said pin, whereby the anchoring device acts as a stop or abutment for the spring.

2. In a shut-off valve of the character described, a casing provided with an inlet passageway and an outlet passageway, a valve seat, a valve member normally spaced from said seat, a rod connected with said valve member and extending exteriorly of the casing, a handle on said rod which acts as a manually operable member and an abutment, a fusible member arranged between said handle and said casing for normally preventing said rod and said valve member moving, whereby the valve member is held away from said seat, and a spring pressing against said handle for giving the handle and rod a tendency to move said valve member against said seat.

In testimony whereof I have signed my name to this specification in the presence of two subscribing witnesses.

WALTER R. ADDICKS.

Witnesses:
  A. L. KITCHIN,
  FRANCIS SNYDER, Jr.